(12) United States Patent
Vainer et al.

(10) Patent No.: US 9,164,990 B2
(45) Date of Patent: Oct. 20, 2015

(54) ANNOTATING CONTEXTUAL WORKSPACES

(75) Inventors: Vitaly Vainer, Kfar Saba (IL); Yahali Sherman, Tel Aviv (IL); Dmitry Khalatov, Yokneam (IL); Ram Alon, Kfar Saba (IL); Guy Bavly, Herzilia (IL)

(73) Assignee: SAP Portals Israel Ltd, Ra'anana (IL)

( * ) Notice: Subject to any disclaimer, the term of this patent is extended or adjusted under 35 U.S.C. 154(b) by 296 days.

(21) Appl. No.: 13/332,060

(22) Filed: Dec. 20, 2011

(65) Prior Publication Data

US 2013/0159926 A1 Jun. 20, 2013

(51) Int. Cl.
*G06F 17/30* (2006.01)
*G06F 3/048* (2013.01)
*G06F 17/27* (2006.01)

(52) U.S. Cl.
CPC ............ *G06F 17/30* (2013.01); *G06F 17/2785* (2013.01); *G06F 17/30525* (2013.01); *G06F 17/30528* (2013.01); *G06F 17/30554* (2013.01)

(58) Field of Classification Search
CPC ................................................ G06F 17/30525
USPC .......................................... 707/722; 715/804
See application file for complete search history.

(56) References Cited

U.S. PATENT DOCUMENTS

| | | | | |
|---|---|---|---|---|
| 6,341,292 | B1 * | 1/2002 | Cho et al. ............... | 1/1 |
| 6,598,046 | B1 * | 7/2003 | Goldberg et al. ....... | 1/1 |
| 6,729,885 | B2 * | 5/2004 | Stuppy et al. ........... | 434/322 |
| 6,733,295 | B2 * | 5/2004 | Stuppy et al. ........... | 434/322 |
| 6,947,947 | B2 * | 9/2005 | Block et al. ............. | 1/1 |
| 7,092,821 | B2 * | 8/2006 | Mizrahi et al. ........... | 702/1 |
| 7,305,381 | B1 * | 12/2007 | Poppink et al. ......... | 1/1 |
| 7,668,812 | B1 * | 2/2010 | Riley et al. .............. | 707/754 |
| 7,870,480 | B1 * | 1/2011 | Oswald et al. ........... | 715/231 |
| 8,060,536 | B2 | 11/2011 | Bavly et al. | |
| 8,086,623 | B2 * | 12/2011 | Dettinger et al. ........ | 707/766 |
| 8,131,750 | B2 * | 3/2012 | Bathiche et al. ......... | 707/769 |
| 8,161,069 | B1 * | 4/2012 | Wilder et al. ............ | 707/783 |
| 8,176,039 | B2 * | 5/2012 | Dettinger et al. ........ | 707/718 |
| 8,225,214 | B2 * | 7/2012 | Abbott et al. ............ | 715/744 |
| 8,560,528 | B2 * | 10/2013 | Herbrich et al. ......... | 707/722 |
| 2003/0151632 | A1 * | 8/2003 | Ryu et al. ................. | 345/853 |
| 2004/0122835 | A1 * | 6/2004 | McKibben et al. ...... | 707/100 |
| 2004/0123242 | A1 * | 6/2004 | McKibben et al. ...... | 715/513 |
| 2004/0158455 | A1 * | 8/2004 | Spivack et al. ........... | 704/9 |
| 2005/0065958 | A1 * | 3/2005 | Dettinger et al. ........ | 707/102 |
| 2005/0080820 | A1 * | 4/2005 | Koppel et al. ........... | 707/104.1 |
| 2005/0182655 | A1 * | 8/2005 | Merzlak et al. .......... | 705/2 |
| 2005/0203876 | A1 * | 9/2005 | Cragun et al. ............ | 707/3 |

(Continued)

OTHER PUBLICATIONS

Martin, Mindy C., Steven M. Hansen, and Beth Klingher. Mastering Excel 2000. San Francisco: SYBEX, 1999.*

*Primary Examiner* — Amresh Singh
*Assistant Examiner* — Edward Jacobs
(74) *Attorney, Agent, or Firm* — Fish & Richardson P.C.

(57) ABSTRACT

In some implementations, a method for providing user-based context to a virtual workspace includes generating a first virtual workspace viewable by a user on a graphical user interface. The virtual workspace comprises a plurality of workspace modules comprising first data aggregated from one or more data objects. The aggregated data is determined to be semantically proximate aggregated data in a second virtual workspace. User annotations assigned to the semantically-proximate aggregated data are identified. The user annotations are presented in the first virtual workplace viewable by the user.

12 Claims, 7 Drawing Sheets

(56) References Cited

U.S. PATENT DOCUMENTS

| | | | |
|---|---|---|---|
| 2005/0235034 A1* | 10/2005 | Chen et al. | 709/206 |
| 2005/0256825 A1* | 11/2005 | Dettinger et al. | 707/1 |
| 2005/0262051 A1* | 11/2005 | Dettinger et al. | 707/3 |
| 2006/0026502 A1* | 2/2006 | Dutta | 715/511 |
| 2006/0200434 A1* | 9/2006 | Flinn et al. | 706/12 |
| 2007/0032244 A1* | 2/2007 | Counts et al. | 455/456.1 |
| 2007/0271249 A1* | 11/2007 | Cragun et al. | 707/3 |
| 2008/0005147 A1* | 1/2008 | Khushraj et al. | 707/102 |
| 2008/0034283 A1* | 2/2008 | Gragun et al. | 715/232 |
| 2008/0040674 A1* | 2/2008 | Gupta | 715/745 |
| 2008/0065655 A1* | 3/2008 | Chakravarthy et al. | 707/100 |
| 2008/0147718 A1* | 6/2008 | Dettinger et al. | 707/E17.044 |
| 2008/0222512 A1* | 9/2008 | Albornoz et al. | 715/230 |
| 2008/0256062 A1* | 10/2008 | Dettinger et al. | 707/E17.014 |
| 2008/0301175 A1* | 12/2008 | Applebaum et al. | 707/102 |
| 2008/0319777 A1* | 12/2008 | Hoff | 705/1 |
| 2009/0070350 A1* | 3/2009 | Wang | 707/E17.044 |
| 2009/0157812 A1 | 6/2009 | Bavly et al. | |
| 2010/0040227 A1* | 2/2010 | Stephens, Jr. | 380/30 |
| 2010/0077300 A1* | 3/2010 | Dugan et al. | 715/273 |
| 2010/0145997 A1 | 6/2010 | Zur et al. | |
| 2010/0161648 A1* | 6/2010 | Eberlein et al. | 707/769 |
| 2010/0211535 A1* | 8/2010 | Rosenberger | 706/20 |
| 2010/0268103 A1* | 10/2010 | McNamara et al. | 600/518 |
| 2011/0004831 A1* | 1/2011 | Steinberg et al. | 715/753 |
| 2011/0088046 A1 | 4/2011 | Guertler et al. | |
| 2011/0137909 A1 | 6/2011 | Guertler et al. | |
| 2011/0137917 A1* | 6/2011 | Boland et al. | 707/747 |
| 2011/0231592 A1 | 9/2011 | Bleier et al. | |
| 2012/0011428 A1* | 1/2012 | Chisholm | 715/230 |
| 2012/0017166 A1* | 1/2012 | Watt | 715/771 |

* cited by examiner

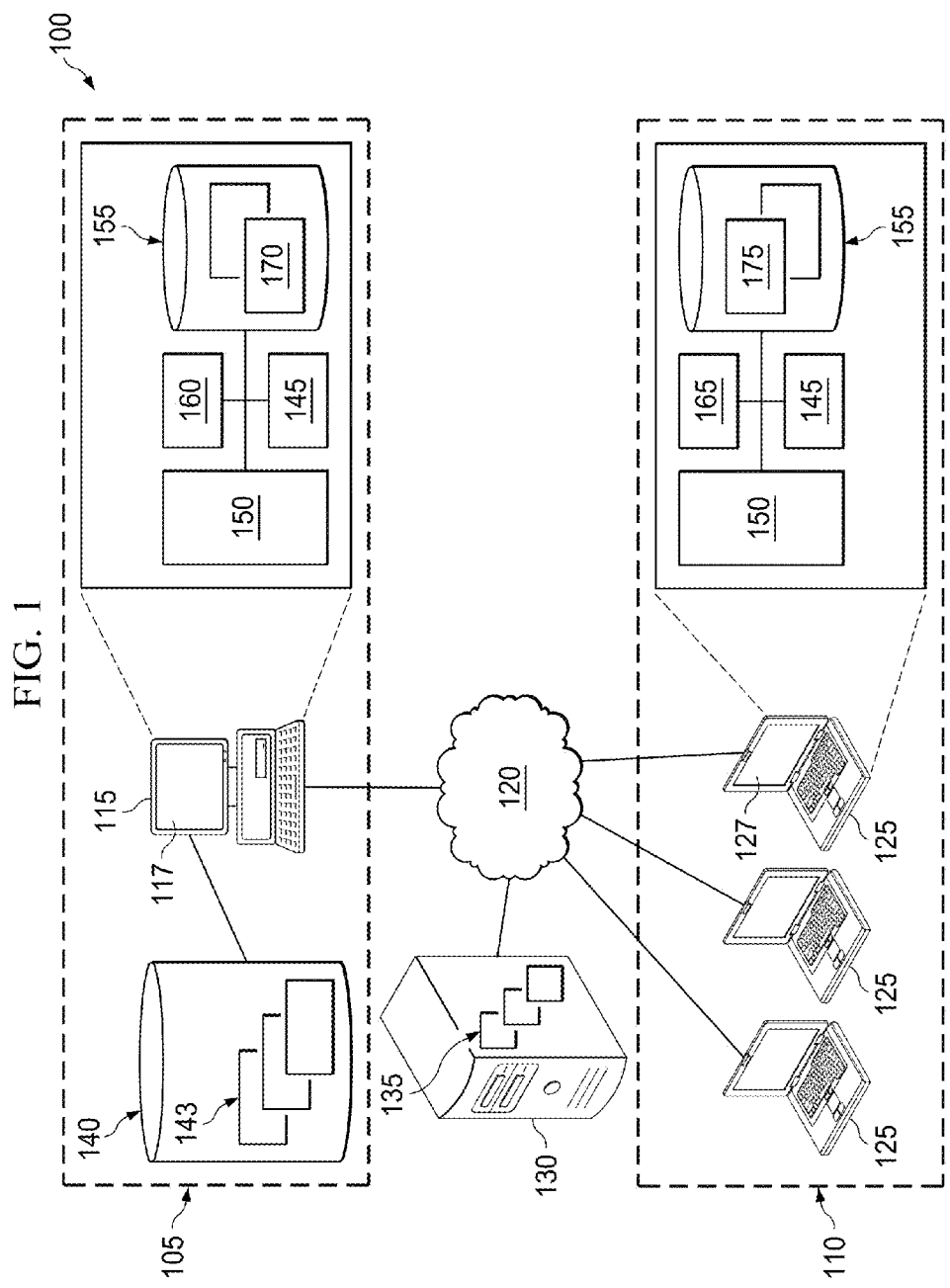

FIG. 4B

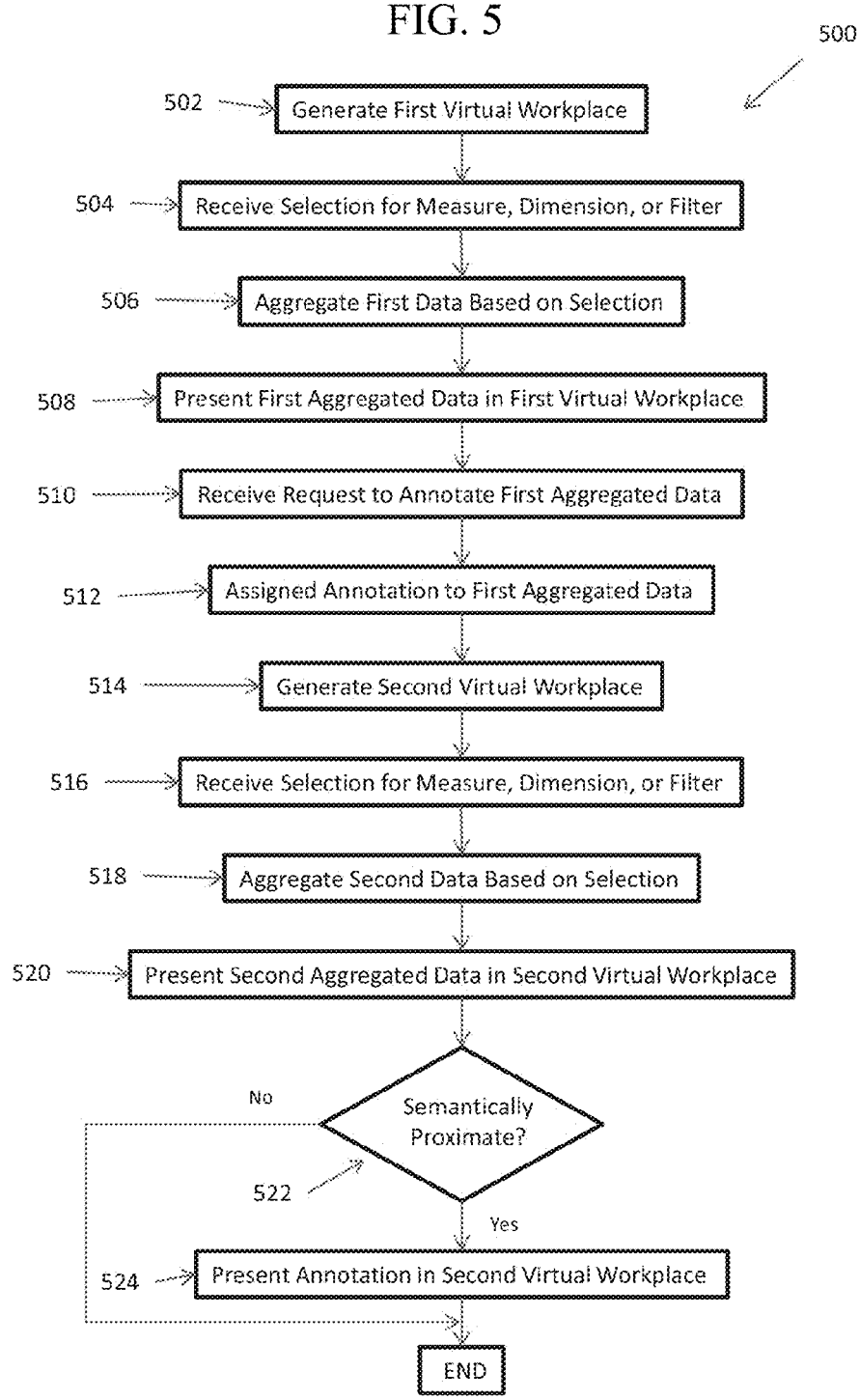

ANNOTATING CONTEXTUAL WORKSPACES

TECHNICAL BACKGROUND

This disclosure relates to using a contextual workspace to view, modify, and/or manage business data for a business enterprise.

BACKGROUND

Business users of software in a business enterprise may utilize a virtual workspace to browse, view, modify, and/or otherwise manipulate data related to the business enterprise. Such data may include a variety of information in many different forms, such as sales data, revenue data, human resources information, business hierarchy information, and otherwise. Graphs, tables, charts, electronic communications, web services, reports, and other forms of data, may be viewable in the user's workspace. The workspace may allow or facilitate the resolution of business issues and/or problems by the user. In some situations, however, the workspace itself has no semantic knowledge of the content being viewed and/or manipulated by the user. Thus, the workspace may not able to provide services to the user that rely on a semantic context of data (active or passive) in the workspace, i.e., one or more workspace modules that are on viewable and/or modifiable on the workspace at a given moment. Contextual information, however, may enable the user to identify relationships between existing modules active in the workspace, relationships between active modules and additional data related to the business enterprise, and, generally, enrich the workspace context.

In some instances, there may be relevant data that is unknown to the business user, such as, for example, additional applications, reports, data feeds, or simply raw data from different content providers. For instance, to react to some business event or to proceed with a business process, the user may need to add relevant content to the workspace to have additional insights or perform further actions. Finding the relevant content is a complex task as each content source offers a lot of content in different formats and protocols, which are not necessarily understood or exposed to the user. Moreover, searching each content provider or other sources of business data for the relevant content is not trivial, as search terms are often complex and content providers might not offer usable search mechanisms.

In some cases, relevant content that may assist the business user in a business event or business process may include content previously generated, viewed, and/or used by a business colleague (e.g., another business user in the same business unit, a different business unit, and/or with a similar role in the business enterprise). The business user, however, may have no way to leverage this internal knowledge about what other colleagues did in similar business situations.

Should such relevant content become available to the business user through the workspace, it can often be disjointed and unmanageable. For instance, certain relevant information may be more critical to the business user compared to other relevant information. For instance, relevant information that a colleague with a similar business role found to be important may be more critical than other information. Thus, as data is collected from various content providers, it may be culled and/or prioritized according to different criteria.

SUMMARY

In some implementations, a method for providing user-based context to a virtual workspace includes generating a first virtual workspace viewable by a user on a graphical user interface. The virtual workspace comprises a plurality of workspace modules comprising first data aggregated from one or more data objects. The aggregated data is determined to be semantically proximate aggregated data in a second virtual workspace. User annotations assigned to the semantically-proximate aggregated data are identified. The user annotations are presented in the first virtual workplace viewable by the user.

Various embodiments of a contextual virtual workspace according to the present disclosure may have one or more of the following features. For example, the contextual workspace may add data content sources (e.g., workspace modules containing data from the content sources) to the workspace, thereby enabling a business user of the workspace to consume data from various sources. The contextual workspace may also apply the relevant workspace module on the workspace at runtime. Further, the contextual workspace may also provide for and/or add a semantic context to the workspace. The semantic context may be aware of all the modules on the workspace (e.g., which module was lately interacted with, which module is active, and otherwise) and enable collection of semantic information on each module (e.g., type, title, and content attributes as well as what operations were done by the user on each module). The contextual virtual workspace may be, therefore, 'smart' in that it may expose semantic content and enable contextual services (e.g., suggestions) based on the content. The contextual workspace may also identify context by combining known information on the contents of the workspace and the user interaction with this content to create a meaningful semantic context. The contextual workspace may thus focus on using content and/or user-related metadata (e.g., collected explicitly or implicitly in the user working environment) to find other relevant content. For example, the contextual workspace may search for content in concrete data and/or data relationships in different content providers (e.g., searching for a metric extracted from a report used by the user in his workspace and looking for data, such as OLAP data cubes or reports, that use the same metric in the some content provider). As another example, the contextual workspace may suggest workspace modules to add to the workspace according to, for instance, a user's last action, one or more combinations of the workspace similarity and other users behavior patterns, user similarity with other users, time proximity, and other factors. Thus, the contextual workspace may utilize social connections (e.g., role of a user in an enterprise, position of the user, organization unit of the user) to formulate a weight coefficient to apply to more data and/or suggestions Various embodiments of a contextual virtual workspace according to the present disclosure may also include one or more of the following features. For example, the contextual workspace may reflect and/or provide business data in real-time through one or more workspace modules that may be updated dynamically. In the present disclosure, the term "real-time" refers to a substantially instantaneous or near instantaneous event. In other words, "real-time" may refer to the concept of user-interaction time, i.e., the amount of processing time by or with the contextual virtual workspace is less than the user's reaction time (e.g., less than 0.5 seconds). The contextual workspace may also search and/or manipulate well modeled tables and cubes for semantic services (e.g., suggestions, simplified data acquisition); semantic services in our solutions occurs in time of user interaction (real time). For example, the contextual workspace may include and/or be coupled with a highly parallelized computational engine with computationally intensive UI patterns (e.g., real time alerts, suggestions). In some aspects, the contextual virtual workspace may be communicably coupled with an in-memory database that allows the user, through the workspace, to instantly (or near instantly) explore and analyze transactional and analytical data from virtually any data source in real-time. Operational data is captured in memory as business happens, and flexible views expose analytic information at the speed of thought. External data can be added to analytic models to expand analysis across an entire business enterprise. In other words, business logic may be closely coupled next to data.

Various embodiments of a contextual virtual workspace according to the present disclosure may also include one or more of the following features. For example, the contextual workspace may collect information about one or more active workspace modules and then recognize relevant content data according to, e.g., metadata, user-interface (UI or workspace module) content, such as headers of a table, activeness of the module, and other metrics. Thus the workspace may push suggestions to the user based on the recent tasks, such as a recent action taken that changes the content of his/her workspace. As another example, the contextual workspace may identify relevant content as the basis of suggestions in the form of a title of a module (e.g., a snapshot of business explorer description); metadata (e.g., names of columns or descriptions of columns of a table); a cube (e.g., measures and/or dimensions of an OLAP cube or other data structure allowing fast access of arrayed data, facet-filtering the cube by measure and/or dimension); reports (e.g., prompts/input fields); location of user's input device in workspace; and/or user selection of text in a particular workspace module.

These general and specific aspects may be implemented using a device, system or method, or any combinations of devices, systems, or methods. The details of one or more implementations are set forth in the accompanying drawings and the description below. Other features, objects, and advantages will be apparent from the description and drawings, and from the claims.

DESCRIPTION OF DRAWINGS

FIG. 1 illustrates an example distributed computing system operable to generate, view, modify, and/or otherwise manipulate a contextual workspace according to the present disclosure;

FIGS. 4A-4C illustrate example contextual workspaces having one or more workspace modules according to the present disclosure; and FIG. 5 is a flowchart illustrating an example method for annotating virtual workplaces.

DETAILED DESCRIPTION

Figure 2A:
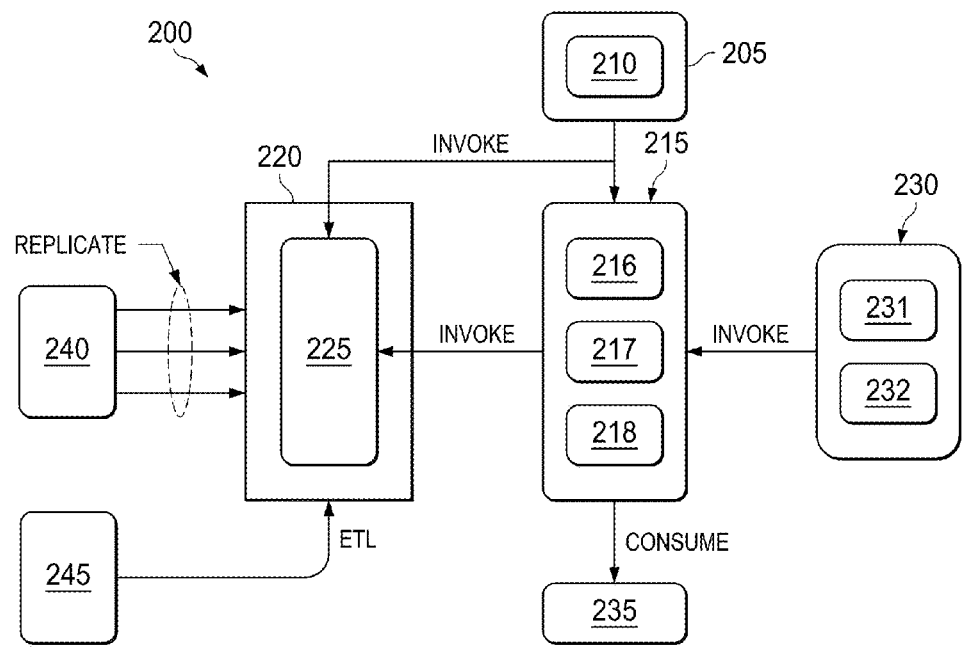
FIGS. 2A-2B illustrate additional example distributed computing systems operable to generate, view, modify, and/or otherwise manipulate a contextual workspace according to the present disclosure.

The present disclosure is directed to a system and method of dynamically annotating aggregated data presented though virtual workspaces. For example, a virtual workspace may present annotations assigned to aggregated data in response to the user selecting the same or similar measure and filter or dimension and filter as the annotators. The annotation may be a text note, a document, a picture, a voice note, and/or other digital file. The measure may include or otherwise identify the data that is aggregated and/or calculations executed on the aggregated data (e.g., sum, average, a statistical operation). The dimension may include, for example, time, product, location, term of business intelligence analysis, or other types of dimensions. In some implementations, the dimensions may be hierarchal with sub-dimensions and members. A filter may include a set of parameters or conditions on the dimensions (e.g., date range). By using filters, measures, and dimensions, the annotations may be assigned to dynamic business content. Most business decision makers work on aggregations of data not just individual items, which is the difference between looking at data from one sale vs. thousands of sales. Thus, insights are assigned to dynamic contexts, so insights can be presented in different virtual workplaces presenting the annotated data. In some implementations, notes may be generated from existing metadata. For example, a west-coast manager may annotate data stating that sales are down 10 percent in New York because of weather in the first quarter. When the manager of the east coast division looks at all sales, the annotation may be presented and may assist in explaining the problem with decrease sales. In these instances, different configurations of virtual workplaces may present annotated data and the assigned annotation, so individuals analyzing or otherwise presenting different granularities of aggregated data may view annotations to the relevant data. In other words, different users may configure or otherwise have their individualized virtual workplace and each may be presented with the annotation regardless of the source virtual workplace configuration. In some implementations, the annotation may not have a linear relationship with what the user is executing since the annotations are assigned to aggregated data.

In some implementations, followed data may have sets of measures, dimensions, and/or filter. In these instances, another user may set an annotation by pointing at, referring to, or otherwise identifying particular data and adding an annotation (e.g., text). The annotation may be written in the context of the particular measure and filter (including visible and invisible filters, a particular dimension and filter, or just filter) . As previously mentioned, the first user may be following the same data but in a different view/artifact such as a graph not a table or bar chart and with some different but overlapping measures, dimensions, and/or filters. The semantic proximity may be close enough between data viewed by two users that the first user gets a "feed" with the annotation set by the second user. In some implementations, the semantic proximity can be identified as followed: (1) no overlap at all between data; (2) the exact same data; (3) data of the first is wholly within the data of second (where annotation is set); (4) data of second (where annotation is set) is wholly within the data of the first data; and (5) there is some intersection between the data. As for some intersection between data, the overlap can be ranked based on one or more ratios based on three data sets: (1) data that is in annotated data and other data or the total amount of data; (2) data that is in other data but not in annotated data or solely the amount of non-annotated data; and (3) data that is in annotated data but not other data or solely the amount of annotated data. The first ratio may include second set of data/first set of data, and the second ratio may include third set of data/first set of data. A threshold may be set based on one or both of these ratios such that if the second ratio is under threshold, then the note is not present to the other user. In some implementations, these calculations may only be computed if the data has the same measure and filter or the same dimension and filter, i.e., the data has the same measure and filter or the same dimension and filter as the annotated data. In some implementations, the filters just the most important dimensions are compared. In some implementations, particular members of those dimensions are taken and assigned annotations are identified for those members. In some implementations, actual queries on the real data, as opposed to metadata, may be executed to figure out the ratios and determine if the threshold is met. A function of the two ratios may be used to calculate a ranking and compare it to the threshold in order to determine if the annotations are shown or not. In some implementations, the user can just generally browse/search annotations that are relevant to the data followed such as drilling down to annotations that are relevant to them and/or performing operations on that subset of annotations. For annotations for data not followed by a user, the user may execute a search or execute a search with context, i.e., with the data you are following. Personal annotations may be configured to display in different views with different granularities, which is more personal than collaborative. While the annotations are typically public, the annotations may be configured to private annotations.

FIG. 1 illustrates an example distributed computing system 100 operable to generate, view, modify, and/or otherwise manipulate a contextual workspace. According to the present disclosure, a contextual workspace may be a virtual workspace viewable (e.g., through a graphical user interface of a particular computing device), modifiable, and or engagable by a user that presents business data connected or related according to one or a number of business contexts. As explained more fully below, the business data may be presented to the user in any of a variety of techniques and views, such as, for example, reports, tables, notes, graphs, and other views. The business data may be connected and/or related according to any of a variety of contexts, such as, for example, a particular business issue or problem, a particular product or service, a particular organizational unit and/or portion of a business enterprise, across a particular position and/or user role found within the business enterprise, and other contexts. Thus, the contextual workspace may help the user solve or attack a business problem, manage one or more products and/or services offered by the business enterprise, and/or take advantage of existing organizational and/or user relationships established across the enterprise.

In some implementations, a "user role" may be a role of a user within his/her business enterprise as determined in the enterprise's corporate human resource (HR) system(s) and its affinity to groups and departments, and a role that may be a dynamically calculated business network relationship within the enterprise based on business solutions developed through one or more enterprise applications. It may include, but not be limited to, participation in particular projects, having particular expertise, participation in the same (e.g., ad hoc) working groups, and otherwise.

The illustrated computing environment 100 includes a server system 105, a client system 110, and a remote computing system 130 communicably coupled through a network 120. Although illustrated as single systems, each of the systems 105, 110, and 130 may include more than one system and/or more than one computing device (e.g., computer, laptop, server, mobile device, and otherwise) within a distributed computing environment. In general, computing environment 100 depicts an example configuration of a system capable of providing stateful execution of stateless applications in a substantially transparent way, as well as dynamically determining the particular application's mode of operation in response to requests from its clients (e.g., client appliances 125).

The illustrated server system 105 includes one or more server appliances 115 having corresponding graphical user interfaces (GUIs) 117. In general, the server appliance 115 is a server that stores one or more applications, where at least a portion of the applications are executed via requests and responses sent to users or clients within and communicably coupled to the illustrated environment 100 of FIG. 1. In some instances, the server appliance 115 may store a plurality of various hosted applications, while in other instances, the server appliance 115 may be a dedicated server meant to store and execute only a single hosted application (e.g., the contextual workspace (server) 160). In some instances, the server appliance 115 may comprise a web server, where the applications, such as the contextual workspace (server) 160 represent one or more web-based applications accessed and executed via network 120 by the client appliances 125 of the environment 100 to perform the programmed tasks or operations of the hosted applications.

At a high level, the server appliance 115 comprises an electronic computing device operable to receive, transmit, process, store, or manage data and information associated with the environment 100. Specifically, the server appliance 115 illustrated in FIG. 1 is responsible for receiving application requests from one or more applications (e.g., associated with clients 125 of environment 100 and responding to the received requests by processing said requests in the associated hosted application 114, and sending the appropriate response from the hosted application 114 back to the requesting client application 144. In addition to requests from the external clients 125 illustrated in FIG. 1, requests associated with the hosted applications 114 may also be sent from internal users, external or third-party customers, other automated applications, as well as any other appropriate entities, individuals, systems, or computers.

As used in the present disclosure, the term "computer" is intended to encompass any suitable processing device. For example, although FIG. 1 illustrates a single server appliance 115, environment 100 can be implemented using two or more server appliances 115, as well as computers other than servers, including a server pool. Indeed, server appliance 115 may be any computer or processing device such as, for example, a blade server, general-purpose personal computer (PC), Macintosh, workstation, UNIX-based workstation, or any other suitable device (e.g., smartphones, PDAs, tablets). In other words, the present disclosure contemplates computers other than general purpose computers, as well as computers without conventional operating systems. Further, illustrated server appliance 115 may be adapted to execute any operating system, including Linux, UNIX, Windows, Mac OS, or any other suitable operating system.

The illustrated server appliance 115 is communicably coupled with in-memory database 140 in the server system 105. In some implementations, server 115 and/or certain of its components may be integrated with database 140 so that, for instance, processing (e.g., all or partial) may be performed directly on in-memory data with processing results passed (e.g., via a communication channel) directly to a client. In alternative implementations, the in-memory database 140 may be located external to the server system 105 and communicably coupled to one or more of the server system 105 and/or client system 110 through the network 120. The illustrated in-memory database 140 may include integrated processing, i.e., all business and/or analytic operations done in processing memory. Moreover, content from business content sources (described more fully below) may be replicated from one or more transactional systems (e.g., coupled to the network 120) to the in-memory database 140 immediately. Thus, the in-memory database 140, in some aspects, may handle the analytical systems for all business data in real-time, as opposed to, for instance, computational processing systems that have separate transactional and analytical systems that connect through relational databases (i.e., relational databases stored on magnetic memory that require a process, e.g., ETL, to transfer data from one system to another not in real time but with a delay of an hour, day, week, or longer).

In some implementations, the in-memory database 140 may expose business data and capabilities to improve an end-solution for end users (e.g., the client appliances 125). The in-memory database 140 may reside on top of a computational engine (e.g., in the server appliance 115 or otherwise) that facilitates fast manipulations on large amounts of business data and/or replication of entire business suite information. Thus, in some implementations, the in-memory database may provide for the following design principles/concepts: business data in real-time (e.g., GUI patterns for constantly updated business data); well modeled tables and data cubes (e.g., in order to provide semantic services); a highly parallelized computational engine (e.g., for computationally intensive GUI patterns such as real time alerts and/or suggestions); close coupling of business logic and business data (e.g., eliminating indexing and caching).

The illustrated in-memory database 140 stores one or more data objects 143. The data objects 143 may include and/or reference a variety of objects that store and/or include business data. For instance, the data objects 143 may be data cubes, such as OLAP (online analytical processing) cubes. The data cubes may consist of a data structure that allows for columnar data storage rather than, e.g., row data storage; different types of indices compared to relational databases; and in-memory technology as compared to data stored in relational databases. The data cube may also allow manipulation and/or analysis of the data stored in the cube from multiple perspectives, e.g., by dimensions, measures, and/or elements of the cube. A cube dimension defines a category of data stored in the cube, for example, a time duration of certain business data, a product or service, business user roles, and a variety of other categories. In other words, a cube dimension may be one way to slice business data stored in the cube according to some business logic (e.g., logic within and/or associated with the contextual workspace modules). In some instances, the data cube may have three-dimensions, but any number of dimensions may be designed into the cube (e.g., a hypercube).

A cube measure may be a fact, such as a numeric fact, that is categorized into one or more dimensions. Measures may include, for example, specific product sales data according to a set period of time. Measures may also include, for example, manufacturing efficiency data for a particular organizational unit of a business enterprise. In short, measures may include any appropriate business data that may be manipulated according to business logic to assist or support the business enterprise.

One or more functions may be performed on a data cube. For instance, the data cube may be pivoted, in various ways. Each pivot provides the business user with a distinct view of particular business data stored in the cube. For instance, in one view, a business user may be presented with sales data of a specific data within a particular geographic region across a particular time period with a particular focus on the sales vs. geography relationship. In another view, the same data (e.g., the same measures and elements) may be presented with a different focus, e.g., the sales vs. time period relationship. In some aspects, pivoting a data cube in real-time may allow the business user to more efficiently analyze the business data.

Other functions performable on data cubes may be, for instance, slice, dice, drill down/up, and roll-up. A slice operation identifies a subset of a multi-dimensional array corresponding to a single value for one or more members of the cube dimensions not in the subset. A dice operation is a slice operation on more than two dimensions of a data cube (or more than two consecutive slices). A drill down/up operation allows the business user to navigate the data cube's levels of data to reveal levels containing the most summarized (up) data to the most detailed (down) data. A roll-up operation involves computing all of the data relationships for one or more dimensions of the data cube.

The data objects 143 may include and/or store other forms of data along with or in place of data cubes. For example, the data objects 143 may represent, store, and/or reference data from one or more content sources, such as web content, feeds, REST services, business data repositories, reports, status updates, discussions, wikis, blogs, and other content sources. Of course, while illustrated as contained in the in-memory database 140, the data objects 143 may also be stored, for example, in one or both of the memories 155, in the remote computing system 130, and/or a separate repository communicably coupled to the network 120. In some implementations, the data objects 143 may be stored in a raw, compiled, or compressed form or combination thereof.

The illustrated client system 110 includes one or more client appliances 125 having corresponding GUIs 127. Each client appliance 125 may be any computing device operable to connect to or communicate with at least the server system 105 and/or via the network 120 using a wireline or wireless connection. Further, as illustrated, each client appliance 125 includes a processor 150, an interface 145, and a memory 155. In general, each client appliance 125 comprises an electronic computer device operable to receive, transmit, process, and store any appropriate data associated with the environment 100 of FIG. 1. It will be understood that there may be any number of client appliances 125 associated with, or external to, environment 100. For example, while illustrated environment 100 illustrates three client appliances, alternative implementations of environment 100 may include a single client appliance 125 communicably coupled to the server system 105, or any other number suitable to the purposes of the environment 100.

Additionally, there may also be one or more additional client appliances 125 external to the illustrated portion of environment 100 that are capable of interacting with the environment 100 via the network 120. Further, the term "client" and "user" may be used interchangeably as appropriate without departing from the scope of this disclosure. Moreover, while each client appliance 125 is described in terms of being used by a single user, this disclosure contemplates that many users may use one computer, or that one user may use multiple computers. As used in this disclosure, client appliance 125 is intended to encompass a tablet computing device, personal computer, touch screen terminal, workstation, network computer, kiosk, wireless data port, smart phone, personal data assistant (PDA), one or more processors within these or other devices, or any other suitable processing device. For example, each client appliance 125 may comprise a computer that includes an input device, such as a keypad, touch screen, mouse, or other device that can accept user information, and an output device that conveys information associated with the operation of the server system 105 or the client appliance 125 itself, including digital data, visual information, any application, or the GUI 127. Both the input and output device may include fixed or removable storage media such as a magnetic storage media, CD-ROM, or other suitable media to both receive input from and provide output to users of the client appliances 125 through the display, namely, the GUI 127.

The illustrated network 120 facilitates wireless or wireline communications between the components of the environment 100 (i.e., between the server system 105 and the client system 110), as well as with any other local or remote computer (e.g., remote computing system 130), such as additional clients, servers, or other devices communicably coupled to network 120 but not illustrated in FIG. 1. The network 120 is illustrated as a single network in FIG. 1, but may be a continuous or discontinuous network without departing from the scope of this disclosure, so long as at least a portion of the network 120 may facilitate communications between senders and recipients. The network 120 may be all or a portion of an enterprise or secured network, while in another instance at least a portion of the network 120 may represent a connection to the Internet. In some instances, a portion of the network 120 may be a virtual private network (VPN), such as, for example, the connection between the client system 110 and the server system 105.

Further, all or a portion of the network 120 can comprise either a wireline or wireless link. Example wireless links may include 802.11a/b/g/n, 802.20, WiMax, and/or any other appropriate wireless link. In other words, the network 120 encompasses any internal or external network, networks, subnetwork, or combination thereof operable to facilitate communications between various computing components inside and outside the illustrated environment 100. The network 120 may communicate, for example, Internet Protocol (IP) packets, Frame Relay frames, Asynchronous Transfer Mode (ATM) cells, voice, video, data, and other suitable information between network addresses. The network 120 may also include one or more local area networks (LANs), radio access networks (RANs), metropolitan area networks (MANs), wide area networks (WANs), cellular networks, all or a portion of the Internet, and/or any other communication system or systems at one or more locations.

The illustrated remote computing system 130 is communicably coupled to one or both of the server system 105 and client system 110 through the network 120. In some instances, as illustrated, the remote computing system 130 stores and/or references third party content 135, such as, for example, data objects, web content, electronic communications, content feeds, and other data sources. Although illustrated as a single appliance, the remote computing system 130 may include any number of appliances (e.g., servers, clients, mobile devices, and otherwise) coupled to the network 120 individually and/or in groups. For instance, in some implementations, the remote computing system 130 may be a web content server delivering web content to one or more of the client appliances 125 in response to a request. In some implementations, the remote computing system 130 may be a repository storing one or more data objects, such as data cubes or other form of database storing business data.

The illustrated communication interfaces 145 (shown as part of the server appliance 115 and the client appliance 125) facilitate communication among appliances in, for example, the client system 110, the remote computing system 130, and the server system 105. The interfaces 145 may also facilitate communication among the illustrated systems and other systems in a client-server or other distributed environment (including within environment 100) connected to the network. Generally, the interfaces 145 include logic encoded in software and/or hardware in a suitable combination and operable to communicate with the network 120. More specifically, the interfaces 145 may include software supporting one or more communication protocols associated with communications such that the network 120 or interface's hardware is operable to communicate physical signals within and outside of the illustrated environment 100.

The illustrated processors 150 (shown as part of the server appliance 115 and the client appliance 125) may be a central processing unit (CPU), a blade, an application specific integrated circuit (ASIC), a field-programmable gate array (FPGA), or another suitable component. Generally, the processors 150 execute instructions and manipulate data to perform the operations of the respective server appliance 115 and client appliance 125 and, specifically, the contextual workspace module (server) 160 and contextual workspace module (client) 165), as well as any other applications. Specifically, the server appliance's processor 150 executes the functionality required to receive and respond to requests from the client appliances 125 and their respective applications (e.g., contextual workspace (client) 165), as well as the functionality required to perform the other operations of the contextual workspace module (server) 160.

Regardless of the particular implementation, "software" may include computer-readable instructions, firmware, wired or programmed hardware, or any combination thereof on a tangible medium operable when executed to perform at least the processes and operations described herein. Indeed, each software component may be fully or partially written or described in any appropriate computer language including C, C++, Java, Visual Basic, assembler, Perl, any suitable version of 4GL, as well as others. It will be understood that while portions of the software illustrated in FIG. 1 are shown as individual modules that implement the various features and functionality through various objects, methods, or other processes, the software may instead include a number of sub-modules, third party services, components, libraries, and such, as appropriate. Conversely, the features and functionality of various components can be combined into single components as appropriate. Although illustrated as a single processor 150 for each of the respective server appliance 115 and client appliance 125 in FIG. 1, two or more processors may be used according to particular needs, desires, or particular implementations of environment 100.

The illustrated memories 155 (shown as part of the server appliance 115 and the client appliance 125) may include any memory or database module and may take the form of volatile or non-volatile memory including, without limitation, magnetic media, optical media, random access memory (RAM), read-only memory (ROM), removable media, or any other suitable local or remote memory component. Each memory 155 may store various objects or data, including classes, frameworks, applications, backup data, business objects, jobs, web pages, web page templates, database tables, repositories storing business and/or dynamic information, and any other appropriate information including any parameters, variables, algorithms, instructions, rules, constraints, or references thereto associated with the purposes of the respective server appliance 115 and client appliance 125. Additionally, each memory 155 may include any other appropriate data, such as VPN applications, firmware logs and policies, firewall policies, a security or access log, print or other reporting files, as well as others.

As illustrated, memory 155 of the server appliance 115 includes and/or stores one or more server content objects 170. Memory 155 of the client appliance 125 includes and/or stores one or more client content objects 175. In some implementations, the server content objects 170 and/or the client content objects 175 may be similar to the data objects 143 stored in the in-memory database 140. For example, the content objects 170 and 175 may be data cubes, tables, reports, or other content sources, such as web content, electronic communications, feeds, and otherwise. Regardless of the form of the content objects 170 and 175, these objects may contain and/or reference business data on which business logic may be applied, e.g., by the contextual workspace module (server) 160 and/or contextual workspace module (client) 165, in order to realize and/or accomplish a task in a business environment.

The illustrated computing system 100 includes a contextual workspace module (server) 160 and a contextual workspace module (client) 165. At a high level, each of the contextual workspace module (server) 160 and a contextual workspace module (client) 165 (referred to collectively as the contextual workspace modules) is any application, program, module, process, or other software that may execute, change, delete, generate, or otherwise manage information according to the present disclosure, particularly in response to and in connection with one or more requests received from the illustrated client appliances 125 and their associated applications. In certain cases, only one contextual workspace module (server) 160 may be located at a particular server appliance 115. In others, a plurality of related and/or unrelated contextual workspace module (server) 160 may be stored at a single server appliance 115, or located across a plurality of other server appliances 115 in the server system 105, as well.

In certain cases, the contextual workspace modules may be implemented as composite applications. For example, portions of the composite application may be implemented as Enterprise Java Beans (EJBs) or design-time components may have the ability to generate run-time implementations into different platforms, such as J2EE (Java 2 Platform, Enterprise Edition), ABAP (Advanced Business Application Programming) objects, or Microsoft's .NET, among others. Additionally, the contextual workspace modules may represent web-based applications accessed and executed by remote client appliances 125 or client applications via the network 120 (e.g., through the Internet).

Further, while illustrated as internal to server appliance 115, one or more processes associated with the contextual workspace module (server) 160 may be stored, referenced, or executed remotely. For example, a portion of the contextual workspace module (server) 160 may be a web service associated with the application that is remotely called, while another portion of the contextual workspace module (server) 160 may be an interface object or agent bundled for processing at a remote client appliance 125 via the contextual workspace module (client) 165. Moreover, any or all of the contextual workspace modules may be a child or sub-module of another software module or enterprise application (not illustrated) without departing from the scope of this disclosure.

As explained more fully below, one or both of the contextual workspace modules 160 and 165 may present or facilitate presentation of a user interface, e.g., through GUI 117 and/or GUI 127, to a business user to perform a variety of tasks. For instance, the contextual workspace modules 160 and 165 may present one or more workspace modules containing business data relevant to the business user in a variety of forms, e.g., tables, graphs, notes, and otherwise. The relevant business data may be sourced from, for example, the data objects 143 or other content sources.

Figure 2B:
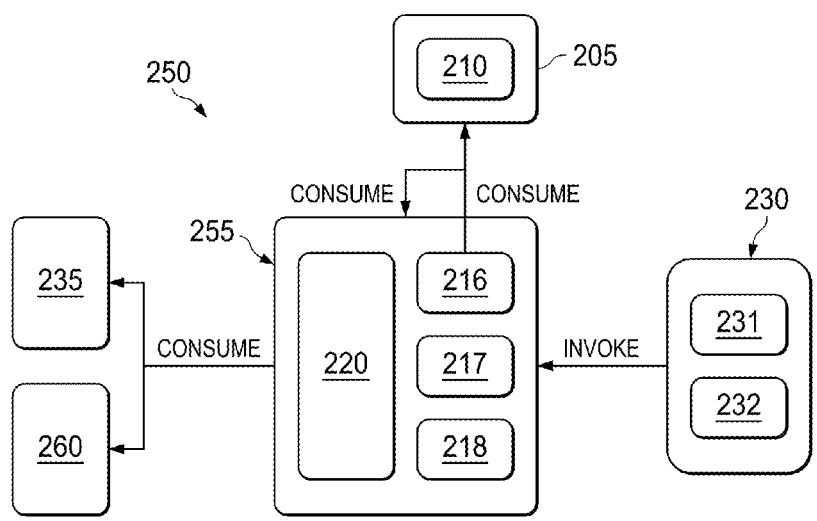

FIGS. 2A-2B illustrate additional example distributed computing systems 200 and 250, respectively, operable to generate, view, modify, and/or otherwise manipulate a contextual workspace. Distributed computing systems 200 and 250, in some implementations, may illustrate two different example configurations for deployment of a contextual workspace within a distributed computing environment. For example, in some instances, either of the distributed computing systems 200 or 250 may represent an alternate deployment of a contextual workspace within a distributed computing environment to the computing system 100 shown in FIG. 1.

Turning to FIG. 2A, the illustrated distributed computing system 200 includes a web portal 205 communicably coupled to a virtual appliance 215 and an in memory database 220. In some implementations, the web portal 205 provides an authentication portal allowing a single point of access to applications, business data, and services both within and external to a business enterprise. For instance, an employee or user of the business enterprise may access the virtual appliance 215 and/or the in-memory database 220 via the web portal 205. In other words, the web portal 205 may provide a front end accessible through a client appliance located at the business enterprise.

The illustrated web portal 205 includes a client enterprise workspace 210. In some aspects, the client enterprise workspace 210 may be substantially similar to the contextual workspace module (client) 165 shown in FIG. 1. For instance, the client enterprise workspace 210 may present or facilitate presentation of a user interface (e.g., one or more workspace modules described more fully below) to the business user to perform a variety of tasks.

The illustrated virtual appliance 215 may be substantially similar to the server appliance 115 illustrated in FIG. 1 and include a server enterprise workspace 216, a business intelligence module 217, and an open source module 218. The server enterprise workspace 216, in some implementations, may be substantially similar to the contextual workspace module (server) 160 shown in FIG. 1. For instance, the server enterprise workspace 216 may provide for a customizable and dynamic virtual workspace accessible to a client and/or user via a GUI, e.g., through the web portal 205. In some aspects, as explained more fully below, such a virtual contextual workspace may provide for a number of functional features and advantages, such as, for instance, providing semantic context to relevant business data, providing suggestions to the user to add semantic and/or social data, and generating a number of ranked suggestions to add semantic data to the workspace according to social criteria.

The illustrated business intelligence module 217, at a high level, provides software and/or middleware services for performance analytics (e.g., supports organizational efforts to develop sophisticated visual representations of processes and performance, providing organizations with new insights that can help them make more informed decisions, assess and plan a business intelligence strategy, deploy dashboard tools, generate management and operational reports, and build an IT infrastructure that provides high scalability for users and data); services for analytic applications (e.g., provides guidance and deployment expertise in implementing analytic applications, offering pre-built analytics and data models to help a customer with a specific business problem in various industries, helping organizations to efficiently deploy applications); and introductory business intelligence services (e.g., introduces organizations to the dynamics of using business intelligence, providing the ability to leverage the functionality of business intelligence—such as executive dashboards and operational reports—without initiating a full-scale implementation).

The illustrated open source module 218, in some implementations, may be an open source web application framework, such as, for example, a Rails (or RoR) for the Ruby programming language. In some implementations, the module 218 may provide generic services like authentication, authorization, repository, logging, and otherwise.

The illustrated virtual appliance 215 is communicably coupled to a business object repository 235 in order to consume (e.g., retrieve, modify, manipulate or otherwise) business objects relevant to the business enterprise. Each business object stored on the repository 235, for example, a capsule with an internal hierarchical structure, behavior offered by its operations, and integrity constraints. In general, the overall structure of the business object model ensures the consistency of the interfaces that are derived from the business object model. The derivation helps ensure that the same business-related subject matter or concept can be represented and structured in the same way in various interfaces. The business object model defines the business-related concepts at a central location for a number of business transactions. In other words, it reflects the decisions made about modeling the business entities of the real world acting in business transactions across industries and business areas. The business object model is defined by the business objects and their relationship to each other (the overall net structure).

Business objects are generally semantically disjointed, i.e., the same business information is represented once. In some implementations, the business objects are arranged in an ordering framework such that they can be arranged according to their existence dependency to each other. For example, in a modeling environment, the customizing elements might be arranged on the left side of the business object model, the strategic elements might be arranged in the center of the business object model, and the operative elements might be arranged on the right side of the business object model. Similarly, the business objects can be arranged in this model from the top to the bottom based on defined order of the business areas, e.g., finance could be arranged at the top of the business object model with customer relationship management (CRM) below finance and supplier relationship management (SRM) below CRM. To help ensure the consistency of interfaces, the business object model may be built using standardized data types as well as packages to group related elements together, and package templates and entity templates to specify the arrangement of packages and entities within the structure.

A business object may be defined such that it contains multiple layers. Typical business object may contains four layers: a kernel layer, an integrity layer, an interface layer, and an access layer. The innermost layer of the example business object is the kernel layer. The kernel layer represents the business object's inherent data, containing various attributes of the defined business object. The second layer represents the integrity layer. The integrity layer contains the business logic of the object. Such logic may include business rules for consistent embedding in a computing environment and the constraints regarding the values and domains that apply to the business object. Business logic may comprise statements that define or constrain some aspect of the business, such that they are intended to assert business structure or to control or influence the behavior of the business entity. It may pertain to the facts recorded on data and constraints on changes to that data. In effect, business logic may determine what data may, or may not, be recorded in business object. The third layer, the interface layer, may supply the valid options for accessing the business object and describe the implementation, structure, and interface of the business object to the outside world. To do so, the interface layer may contain methods, input event controls, and output events. The fourth and outermost layer of the business object is the access layer. The access layer defines the technologies that may be used for external access to the business object's data. Some examples of allowed technologies may include COM/DCOM (Component Object Model/Distributed Component Object Model), CORBA (Common Object Request Broker Architecture), RFC (Remote Function Call), Hypertext Transfer Protocol (HTTP) and Java, among others. Additionally, business objects of this implementation may implement standard object-oriented technologies such as encapsulation, inheritance, and/or polymorphism.

The illustrated system 200 includes the in-memory database 220 communicably coupled to the web portal 205 and the virtual appliance 215. For example, as illustrated, the in-memory database 220 may be invoked by either or both of the web portal 205 and the virtual appliance 215. The in-memory database 220 may be substantially similar to the in-memory database 140 described in FIG. 1. Further, the in-memory database 220 includes in-memory business logic 225 (which, as illustrated, may be invoked by either or both of the web portal 205 and the virtual appliance 215). The in-memory business logic 225 may include a combination of one or more of software, middleware, and hardware (or other logic) operable to manipulate one or more data objects (e.g., stored in-memory on the database 220). For instance, the in-memory business logic 225 may perform functionality associated with and/or used by the enterprise workspace (client) 210 and/or enterprise workspace (server) 216, as well as other functionality disclosed herein.

The illustrated in-memory database 220 is communicably coupled to a business suite 240. In some implementations, as described above, complete or partial processing may be done directly on a database, thus rendering making components like the "database," "server," and/or "suite" substantially similar or identical. At a high level, the business suite 240 may consist of one or more integrated enterprise applications enabling, e.g., business enterprises, to execute and optimize business and IT strategies, such as performing industry-specific, and business-support processes. In some implementations, the business suite 240 may be built on an open, service-oriented architecture (SOA). Such integrated business applications may be replicated, for example, via the web portal 205 through the in-memory database 220, such as via the enterprise workspace (client) 210.

The illustrated in-memory database 220 is also communicably coupled to third party content 245. The third party content 245, for example, may be substantially similar to data stored and/or referenced by the remote computing system 135 described with reference to FIG. 1, such as, for example, the third party content 135. In some aspects, the third party content 245 may be stored and/or accessed through relational databases (i.e., relational databases stored on magnetic memory that require a process, e.g., ETL, to transfer data from one system to another not in real time but with a delay of an hour, day, week, or longer). For instance, while some business data may be stored on the in memory database 220 and therefore, be accessible in real-time, some business data may be available to and/or exposed by the in-memory business logic 225, such as the third party content 245.

The illustrated system 200 also includes one or more clients 230. For instance, as illustrates, the clients 230 may include a mobile client 231, and a web workspace 232. One or more of the clients 230 may invoke, for example, the enterprise workspace (server) 216, on the virtual appliance 215 in order to access and/or expose the functionality of the in-memory business logic 220. For example, the mobile client 231 may facilitate invocation of the enterprise workspace (server) 216 from a mobile device (e.g., cell phone, smart phone, email mobile device, PDA, or other mobile device). The web workspace 232 may, for instance, facilitate invocation of the enterprise workspace (server) 216 through a network connection, such as the global network known as the world wide web.

Turning to FIG. 2B, the illustrated distributed computing system 250 includes the web portal 205 communicably coupled to an in-memory application server 255, which, in turn, is communicably coupled to the clients 230, the business object repository 235, and a business financial management module 260. Accordingly, as illustrated, the distributed computing system 250 may provide for an alternative deployment configuration of a system operable to generate, view, modify, and/or otherwise manipulate a contextual workspace, as compared to the system 200, but with similar (or identical) components in some respect. For example, as illustrated, the in-memory application server 255 in system 250 may replace the virtual appliance 215/in-memory database 220 shown in FIG. 1. The in-memory application server 255, as illustrated, includes the in-memory database 220 (including, for example, the in-memory business logic 225, not shown here). The in-memory application server 255, as illustrated, also includes the server enterprise workspace 216, the business intelligence module 217, and the open source module 218.

The illustrated business financial management module 260, generally, supports IT services costing, customer value analysis, cost to serve, bill of material costing, and activity based costing, among other financial metrics. In some implementations, for example, the business financial management module 260 may provide for user-friendly, rapid, and efficient model building; accurate calculation and cross-charge for IT and other shared services; monitoring and manage costs, pricing, and true profitability; accurate assignment of overheads and indirect costs to customers, products, and channels; access to cost and profitability data by customer, product, or business channel; accurate assignment, monitoring, and analysis of overhead costs tied to bill of materials, among other functions.

Figure 3:
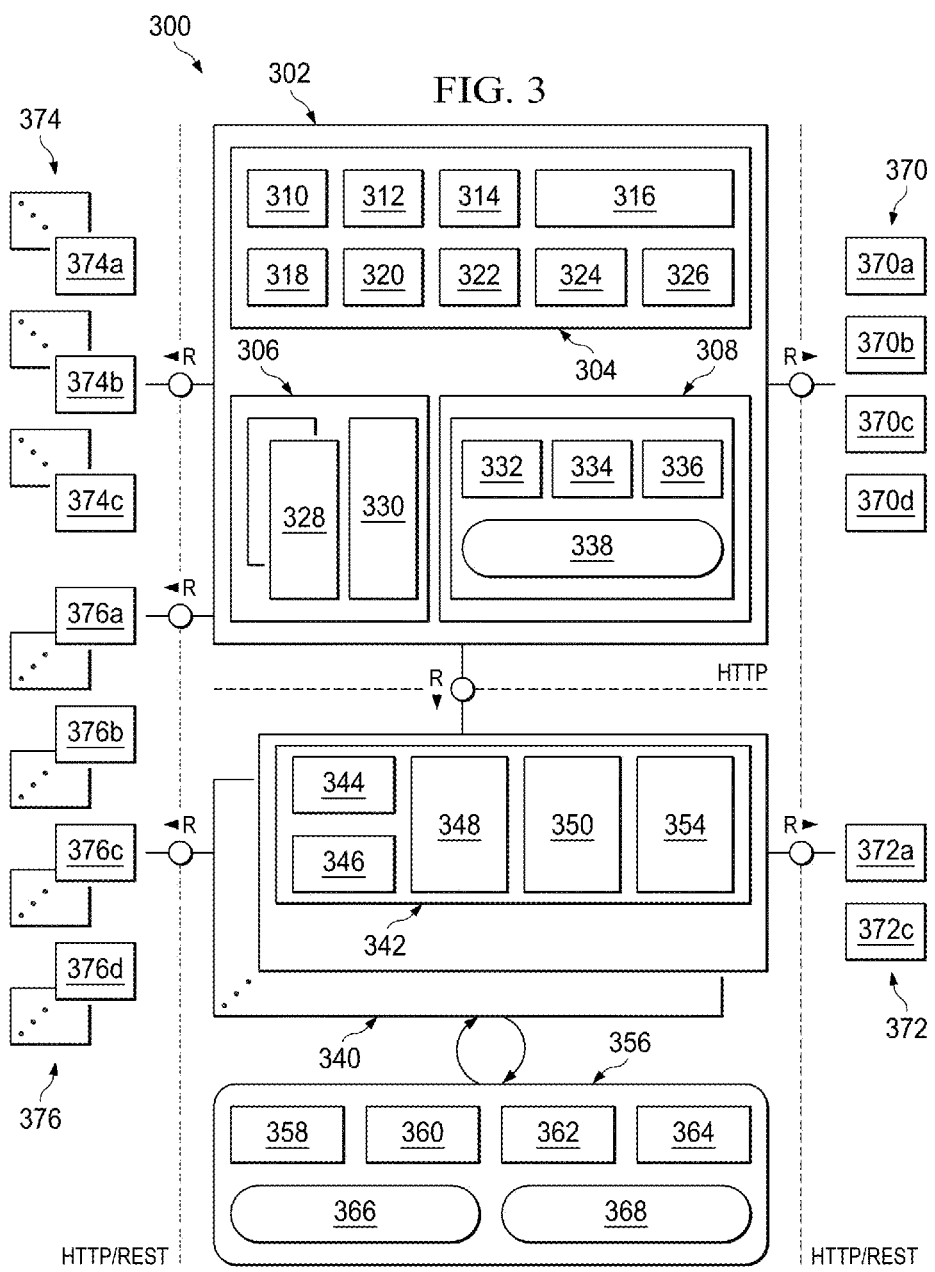
FIG. 3 illustrates an example virtual distributed computing system operable to generate, view, modify, and/or otherwise manipulate a contextual workspace according to the present disclosure.

FIG. 3 illustrates an example virtual distributed computing architecture 300 operable to generate, view, modify, and/or otherwise manipulate a contextual workspace. As illustrated, the virtual distributed computing architecture 300 includes a web client 302, a web server 340, an in-memory computing engine 356, one or more external services 370, one or more consumption channels 372, one or more external content providers 374, and one or more data sources 376. As further illustrated, the web client 302, the web server 340, the in-memory computing engine 356, the one or more external services 370, the one or more consumption channels 372, the one or more external content providers 374, and/or the one or more data sources 376 may be communicably coupled through an HTTP and/or REST architecture.

The illustrated web client 302 includes a UI module 304, a connectivity module 306, and a context module 308. The illustrated UI module 304, in some implementations, may generate, modify, and/or maintain a virtual contextual workspace and present the workspace to a user through a GUI. The UI module 304 includes a workspace manager 310, a module gallery 312, a layout manager 314, a data orchestrator 316, a contextual assistance module 318, a global filtering module 322, a data streaming module 324, and a timeline module 326. The illustrated workspace manager 310, in some implementations, may include functionality that manages operation and use of the contextual workspace by the user.

The illustrated module gallery 312, in some implementations, may keep track of one or more workspace modules (such as the workspace modules shown in FIGS. 4A-4C) viewable on and/or available to a contextual workspace presented to the user. For example, the module gallery 312 may include an index (e.g., stored in a repository) of the current workspace modules being viewed by the user in the contextual workspace.

The illustrated layout manager 314, in some implementations, may determine how one or more selected and/or requested workspace modules may be arranged on the contextual workspace. For example, the layout manager 314 may determine a size and/or placement of each module on the contextual workspace in order to, for instance, better manage the contextual workspace in the GUI presented to the user.

The illustrated data orchestrator 316, in some implementations, may determine, for example, one or more available views and/or functionality available to the user with respect to a data cube (e.g., an OLAP cube storing business data exposable to the user). For example, the data orchestrator 316 may determine how to present or show any data model, including a data cube, to the user (e.g., icon, full screen, or something in between).

The illustrated contextual assistance module 318, in some implementations, may include functionality that provides the user of the contextual workspace generated by the architecture 300 with additional business data contextually relevant with business data being currently viewed in the workspace. For instance, as described below with respect to FIG. 5, the contextual assistance module 318 (or other modules included in the illustrated architecture 300) may identify semantically related information to that currently viewed on the contextual workspace by the user. The semantically related information may be suggested to the user, for example, to add to the contextual workspace through one or more workspace modules.

The illustrated global filtering module 320, in some implementations, may provide for functionality that, for example, ranks and/or filters various suggestions for content (e.g., semantically related content or socially related content) to be added to the user's contextual workspace through architecture 300. For instance, as described below with respect to FIG. 9, the global filtering module 320 (or other modules included in the illustrated architecture 300) may rank suggestions to add semantically related data to the user's contextual workspace according to one or more social metrics.

The illustrated data annotations module 322, in some implementations, may provide for functionality that, for example, allows a user to generate notes (or other annotations) that provide specific context to data within one or more workspace modules in the contextual workspace. For instance the data annotations module 322 may, in some aspects, allow the user to dynamically create and/or view insights (e.g., notes or other annotations) on contexts of data within the contextual workspace. The insights could be for the user or other users (e.g., a collaboration).

The illustrated data streaming module 324, in some implementations, may manage, direct, and/or control the transfer of data (e.g., from data objects, data cubes, documents, reports, feeds, and other data sources) to, for example, the web client 302. For instance, the data streaming module 324 may manage the speed at which data is transferred to the web client 302 to, for example, expose on one or more workspace modules of the contextual workspace generated and presented to the user.

The illustrated timeline module 326, in some implementations, may provide for functionality that allows a user to "time travel" through one or more previous views of a contextual workspace. For instance, in some implementations, each distinct contextual workspace (i.e., each view with a distinct set, combination, and/or number of workspace modules included within the contextual workspace) may be time stamped with a particular time (e.g., hour/minute/day, date, week, month, or other granularity). The time stamp may be part of the metadata of the contextual workspace generated by and presented to the user. In some aspects, the user may "time travel" back in time to view previous versions of the contextual workspace according to the time stamp. Thus, not only the data contained in the contextual workspace, but the user's subjective view on the data (e.g., which workspace modules were selected) can be retrieved. The user may filter the contextual workspace versions by the time stamp, data exposed in the contextual workspaces, keywords, and/or other metrics.

The illustrated connectivity module 306 includes, in some implementations, context sources module 328 and a content fetching module 330, and, in some aspects, may provide connection functionality for the web client 302 to communicate with, for example, the web server 340, the in-memory computing engine 356, the data sources 376, and/or other content repositories or sources. The illustrated context sources module 328, in some implementations, may provide for functionality to the web client 302 to connect to various sources of contextually relevant (e.g., semantically relevant) data related to one or more workspace modules in the contextual workspace. For example, semantically relevant data may be exposed from, for example, data objects, data cubes, documents, search functions, social data (e.g., people), and other sources. In some implementations, for example, the context sources module 328 may function along with other components of the illustrated architecture (e.g., the contextual services manager 350, the social suggestions module 358, and other components) to perform the functionality described in FIG. 5, as well as other processes and methods described herein.

The illustrated content fetching module 330, in some implementations, may provide functionality to retrieve and/or gather data content from one or more data sources, such as, for example, data objects, data cubes, documents, search functions, social data (e.g., people), and other sources.

The illustrated context module 308 includes, in some implementations, a context discovery module 332, a suggestions and rankings module 334, an events and alerts module 336, and a context model 338. In some aspects, the context module 308 may provide functionality related to discovering and/or suggesting semantically relevant data (e.g., from data objects, data cubes, and otherwise) related to data being viewed by the user on the contextual workspace. The illustrated context discovery module 332, in some implementations, may provide functionality related to searching for and/or exposing semantically relevant content related to data on the contextual workspace, e.g., in one or more workspace modules. For example, semantically relevant data may include information related to data that the user works with or views in the contextual workspace and/or arranges (according to his/her expertise) within the contextual workspace. For instance, the arrangement of data (e.g., which workspace modules are selected and/or viewed) may provide at least a portion of the overall context of the workspace apart from the data (numerical or otherwise). The semantically relevant data may be related, e.g., according to keywords, metadata, cube dimensions, cube measures, cube views, table headings, etc., which may be unknown to the user (due to, for instance, the vast amount of data available to the user).

The illustrated suggestions and rankings module 334, in some implementations, may include functionality that provides suggestions of semantically relevant data to the user to add to the contextual workspace. The suggestions and rankings module 334 may also include functionality that ranks a number of suggestions of semantically relevant data according to, for example, matching keywords, matching metadata, social metrics, and/or other criteria. For instance, in some aspects, the suggestions and rankings module 334 may include functionality illustrated in one or more of the methods shown in FIG. 5.

The illustrated events and alerts module 336, in some implementations, may include functionality that allows the user set an alert, e.g., at a given point of time when a particular event is occurring. The user, therefore, may be reminded (at a later time) of how that particular problem was resolved. In some aspects, the events and alerts module 336 may also provide a user with notification (via one or more workspace modules of the contextual workspace) of events and/or alerts based on, for instance, actions of other users with similar roles within the business enterprise (e.g., within the same organization unit, or having the same title).

The illustrated context model 338, in some implementations, may build and/or generate a model (e.g., a context bag) containing the discovered semantically relevant data related to the contextual workspace data exposed in one or more workspace modules.

The illustrated web server 340 includes a workspace services module 342. The illustrated workspace services module 342 includes a content provider manager 344, a workspace data manager 346, a context data manager 348, a contextual services manager 350, and a data acquisition and modeling module 354. The illustrated content provider manager 344 and the illustrated workspace data manager 346, in some implementations, may direct, control, and/or otherwise manage the content and data exposed on the one or more workspace modules in the contextual workspace.

The illustrated context data manager 348, in some implementations, may direct, control, and/or otherwise manage semantically relevant content (e.g., determined according to, for example, metadata contained in the workspace modules on the contextual workspace). For example, the context data manager 348, either alone or along with one or more other components of the architecture 300 (e.g., the semantic suggestions module 360, the suggestions and rankings module 334, and/or other components) may provide functionality illustrated in one or more of the methods shown in FIG. 5. In some implementations, the illustrated contextual services manager 350 may include functionality that assists (at least partially) the context data manager 348 in directing, controlling, and/or otherwise managing semantically relevant.

The illustrated data acquisition and modeling module 354, in some implementations, may perform modeling functionality on business data to be exposed in one or more workspace modules in the contextual workspace. For instance, the data acquisition and modeling module 354 may model data objects, such as data cubes, as three-dimensional workspace modules in the contextual workspace.

The illustrated in-memory computing engine 356 includes a social suggestions module 358, a semantic suggestions module 360, an alert engine 362, a data annotations module 364, a context database 366, and a business suite database 368. In some implementations, the social suggestions module 358 may, in some implementations, include functionality that provides suggestions of socially relevant data to the user to add to the contextual workspace. For instance, the suggestions may include business data that other users (e.g., other business users in the same organizational unit of the enterprise, same team of the user, or same role of the user, to name a few) found relevant and/or useful. The suggested business data may also be contextually relevant to one or more workspace modules active in the user's contextual workspace. The social suggestions module 358 may, in some aspects, include functionality illustrated in one or more of the methods shown in FIG. 5.

The illustrated semantic suggestions module 360, in some implementations, include functionality that provides suggestions of semantically relevant data to the user to add to the contextual workspace. For instance, the suggestions may include business data that has some related contextual similarity with data exposed in one or more workspace modules in the user's contextual workspace. For example, the semantically relevant data may be business data from a data cube having one or more similar dimensions and/or measures as compared to a data cube currently being viewed and/or analyzed in the contextual workspace. As another example, the semantically relevant data may be business data from a table having a similar heading to a table currently being viewed in the contextual workspace. Thus, the suggested semantically relevant data may be business data that provides insight to the user that the business user would not have known about otherwise. The semantic suggestions module 360 may, in some aspects, include functionality illustrated in one or more of the methods shown in FIG. 5.

The illustrated alert engine 362, in some implementations, in some implementations, may include functionality that allows the user set an alert, e.g., at a given point of time when a particular event is occurring. The user, therefore, may be reminded (at a later time) of how that particular problem was resolved. In some aspects, the alert engine 362 may also provide a user with notification (via one or more workspace modules of the contextual workspace) of alerts based on, for instance, actions of other users with similar roles within the business enterprise (e.g., within the same organization unit, or having the same title).

The illustrated data annotations module 364, in some implementations, may provide for functionality that, for example, allows a user to generate notes (or other annotations) that provide specific context to data within one or more workspace modules in the contextual workspace. For instance the data annotations module 364 may, in some aspects, allow the user to dynamically create and/or view insights (e.g., notes or other annotations) on contexts of data within the contextual workspace. The insights could be for the user or other users (e.g., a collaboration).

The illustrated context database 366, in some implementations, may store and/or reference one or more contextually relevant data objects, such as data objects that have been determined (e.g., by one or more components of the architecture 300 such as the social suggestions module 358, the semantic suggestions module 360, or other component) to be socially and/or semantically relevant based on one or more workspace modules in the contextual workspace. For example, the context database 366 may store and/or reference one or more data cubes, reports, documents, business objects, or other data objects. In some implementations, the context database 366 may also store and/or reference one or more suggestions (e.g., social, semantic, or otherwise) generated by the architecture 300.

The illustrated business suite database 368, in some implementations, may store and/or reference business data, such as business data utilized by the business suite app 374a.

The illustrated external services 370 include an event insight 370a, social intelligence 370b, text analysis 370c, and feed services 370d. Generally, the illustrated external services 370 may provide business data (e.g., semantically and/or socially relevant business data) to at least one of the web client 302, the web server 340, and/or in-memory computing engine 356. For instance, the illustrated event insight 370a, in some implementations, may provide alerts to the web client 302 and/or web server 340 to present to the business user through one or more workspace modules of the contextual workspace. The illustrated social intelligence 370b, in some implementations, may provide social business data (e.g., social connections between one or more business users in a business enterprise) to the web client 302 and/or web server 340 to present to the business user through one or more workspace modules of the contextual workspace. For example, the social business data may be a graph and/or chart showing business connections between employees, such as, for instance, a degree of connection between the employees (e.g., through one or more known business contacts). The illustrated text analysis 370c, in some implementations, may identify business data located in documents or other data objects through, for instance, a keyword search or metadata search of the text in the documents. The illustrated feed services 370d, in some implementations, may provide business data through one or more web feeds to the web client 302 and/or web server 340 (e.g., RSS feeds).

The illustrated consumption channels 372 include a mobile channel 372a and one or more feed clients 372c. Typically, the consumption channels 372 may also provide business data (e.g., semantically and/or socially relevant business data) to at least one of the web client 302, the web server 340, and/or in-memory computing engine 356. For instance, the illustrated mobile channel 372a, in some implementations, may provide business to the web client 302 and/or web server 340 from one or more mobile channels to present to the business user through one or more workspace modules of the contextual workspace.

The illustrated feed clients 372c, in some implementations, may include, for example, a mail client, which may provide business data to at least one of the web client 302, the web server 340, and/or in-memory computing engine 356 through one or more electronic communications.

The illustrated external content providers 374 include one or more UI applications, such as a business suite app 374a, a business intelligence app 374b, and a social gadget app 374c. Typically, the external content providers 374 provide for a number of UI applications that may be interfaced by a user, e.g., through the web client 302 or otherwise. The business suite app 374a, for example, may be business applications that provide integration of information and processes, collaboration, industry-specific functionality, and scalability. For instance, the business suite app 374a may include one or more constituents, such as CRM (Customer Relationship Management), ERP (Enterprise Resource Planning), PLM (Product Lifecycle Management), SCM (Supply Chain Management), and/or SRM (Supplier Relationship Management). The business intelligence app 374b, for example, may provide for a UI application that may be used in identifying and extracting business data (e.g., ETL) and analyzing such business data. The business data may include, for example, sales revenue, profits, and/or costs broken down by products and/or departments. In some aspects, the business intelligence app 374b may provide for historical, current, and/or predictive views of business operations, such as reporting, online analytical processing, analytics, data mining, process mining, business performance management, benchmarking, text mining, and/or predictive analytics. In some aspects, the business intelligence app 374b may also provide for layers including an ETL layer (e.g., responsible for extracting data from a specific source, applying transformation rules, and loading it into a data warehouse); the data warehouse (e.g., responsible for storing the information in various types of structures); reporting (e.g., responsible for accessing the information in the data warehouse and presenting it in a user-friendly manner to the business user); and a planning and analysis layer (e.g., provides capabilities for the user to run simulations and perform tasks such as budget calculations). The illustrated social gadget app 374c, for example, may include games, social news feeds and other UI apps.

The illustrated data sources 376 include an in-memory database 376a, a gateway 376b, one or more feeds 376c, and one or more documents 376d. Typically, the data sources 376 may provide data, such as business data, to the illustrated web client 302 and/or web server 340 that may be manipulated to, for instance, provide suggestions of additional contextual data, provide suggestions of semantically-related data, and/or provide other suggestions, alerts, or events. For example, the in-memory database 376a may store and/or reference one or more data cubes containing business data. The gateway 376b may, for example, be a front-end server to the business suite app 374 and expose business suite services in an open protocol format. The feeds 376c, for instance, may provide business and/or social data through social updates, for example, Twitter, Facebook, RSS feed/channels, and/or other feed sources or channels. The documents 376d, for instance, may be any number of documents stored in or referenced by a document store (i.e., in a relational database or otherwise).

Figure 4A:
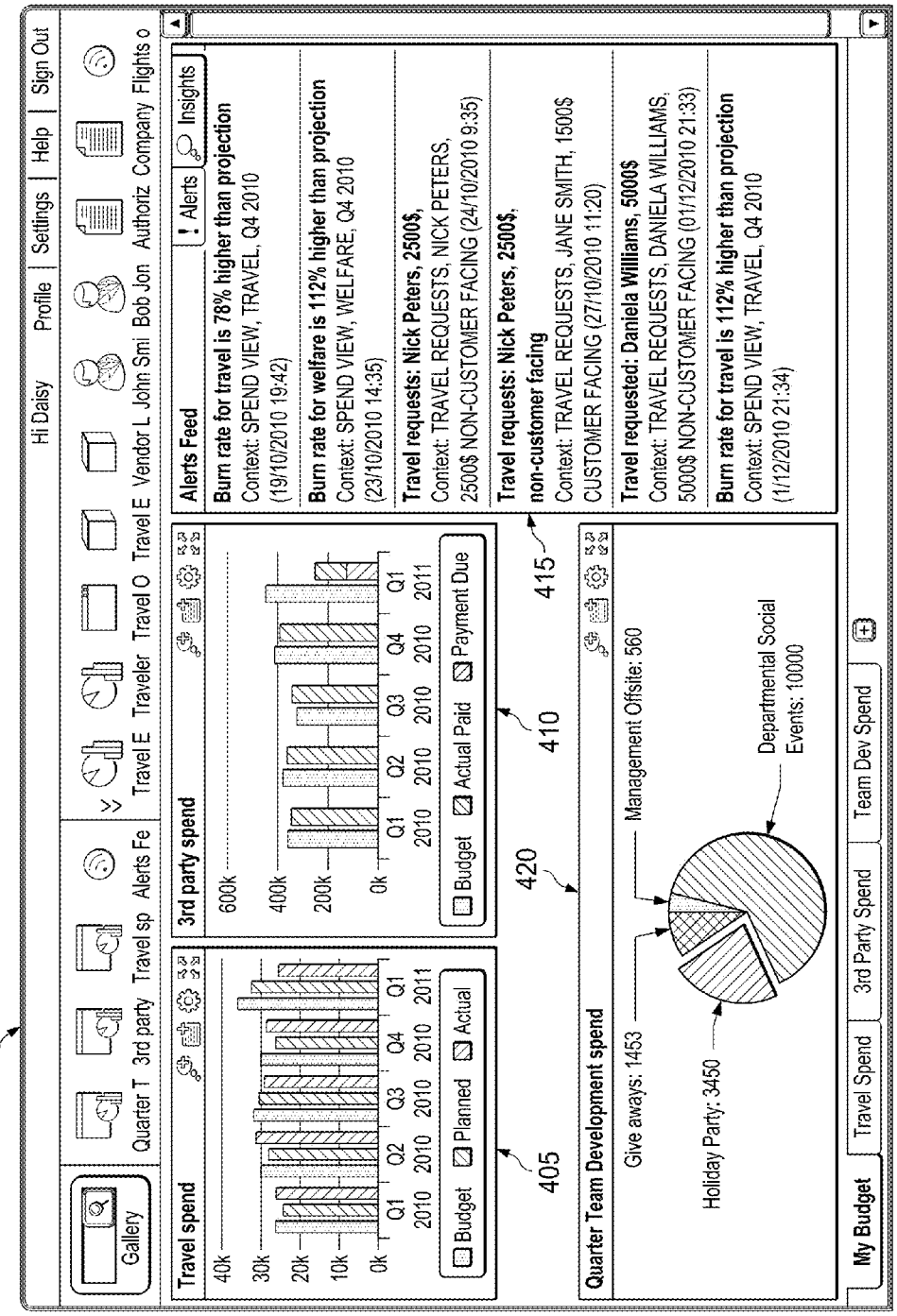
Figure 4B:
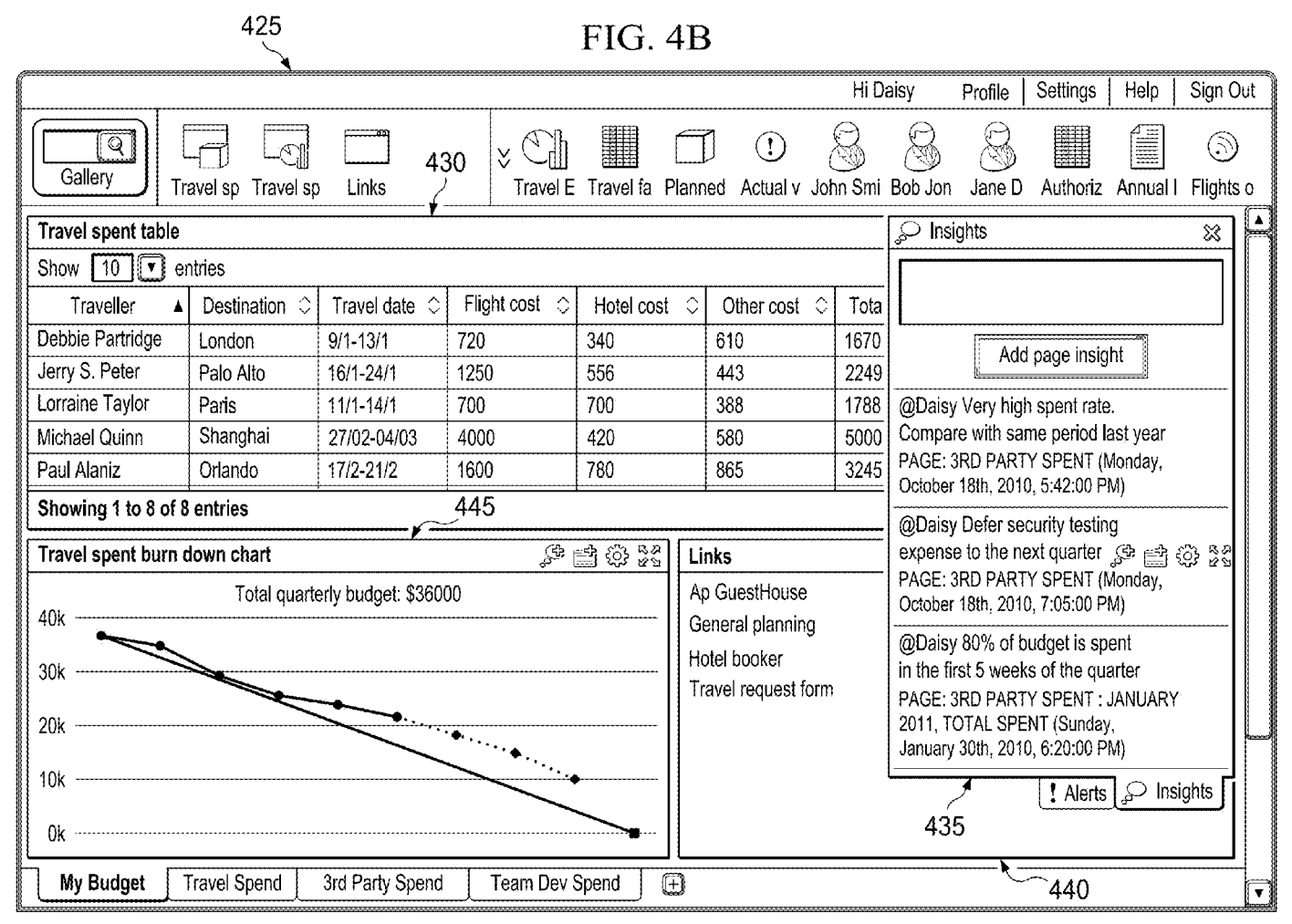
Figure 4C:
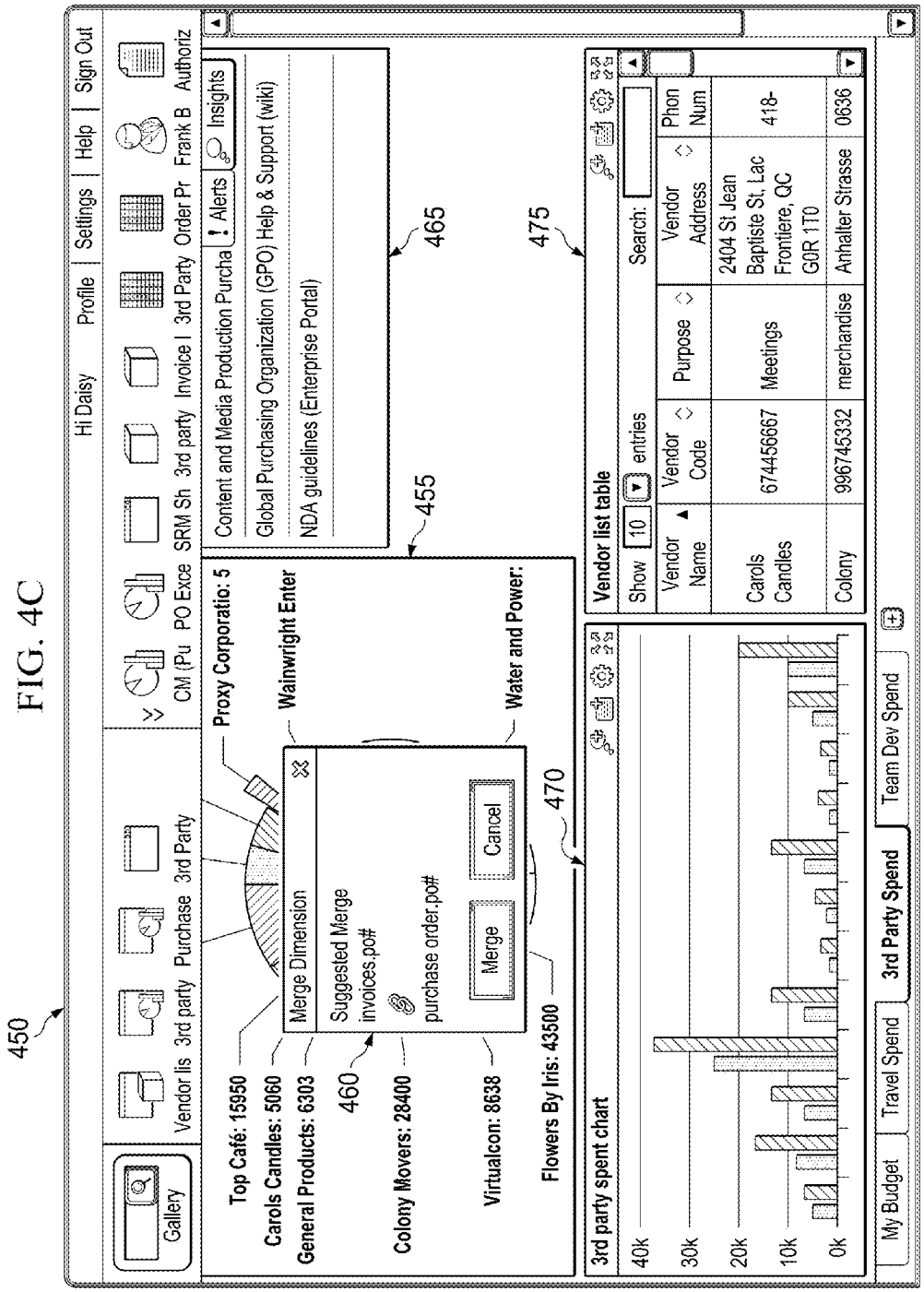

FIGS. 4A-C illustrate example virtual contextual workspaces 400, 425, and 450, respectively, having one or more workspace modules. In some implementations, one or more of the workspace modules (e.g., workspace modules 405, 410, 415, and 420 illustrated in FIG. 4A) may be a combination of iFrames and/or Div frames, which may expose underlying business data, e.g., from one or more data sources illustrated in FIGS. 1, 2A-2B, and/or 3. Further, the illustrated workspace modules may include or describe data that is contextually relevant and/or related within the virtual contextual workspace.

Turning to FIG. 4A, the illustrated virtual contextual workspaces 400 includes workspace modules 405, 410, 415, and 420. The illustrated workspace module 405, for example, shows a module including a bar graph, e.g., of travel spending by time period. The illustrated workspace module 410, for example, shows a module including a bar graph, e.g., of third party spending finances by time period. The illustrated workspace module 415, for example, shows a module including a list of alert feeds, e.g., of alerts related to travel spending and/or travel requests of a business enterprise. The illustrated workspace module 420, for example, shows a module including a pie graph, e.g., of development spending of an organizational unit of the enterprise during a specific time duration.

As illustrated, one or more of the workspace modules 405, 410, 415, and 420 may be semantically related. In other words, one or more of the workspace modules 405, 410, 415, and 420 may display and/or expose business data that is related by some specific context. For instance, semantically related data may be arranged in the workspace modules 405, 410, 415, and 420 according to how the business user works on the contextual workspace 400 (e.g., how the user puts things together (according to his/her expertise)). While the user may not know all the available data, there may be a context to the workspace 400 that he/she understands. This context, for instance, could be keywords, metadata, dimensions/slices of data, and otherwise. While other users (even other users within the same business enterprise, same organization unit, or otherwise) may not understand the context of the workspace 400, the user understands the desired context. The user, however, likely does not know (or is not aware of) all of the data that is available for this context.

Turning to FIG. 4B, the illustrated virtual contextual workspaces 425 includes workspace modules 430, 435, 440, and 445. The illustrated workspace module 430, for example, shows a module including a table, e.g., of entries for travel spending by employee. The illustrated workspace module 435, for example, shows a module including insights, e.g., of an enterprise employee and/or user of the contextual workspace 425 providing business insights related to the workspace. For example, module 435 shows insights related to business employee travel spending and financial data. The illustrated workspace module 440, for example, shows a module including a list of links, e.g., of websites (external and internal), contact names, and/or forms, relevant to the contextual workspace 425. The illustrated workspace module 445, for example, shows a module including a bar graph, e.g., of spent travel budget for the enterprise during a specific time duration.

Turning to FIG. 4C, the illustrated virtual contextual workspaces 450 includes workspace modules 455, 465, 470, and 475. The illustrated workspace module 455, for example, shows a module including a pie graph, e.g., of travel spending by vendor, along with a suggestion 460 to merge different types of documents (here, invoices and purchase orders). The illustrated workspace module 465, for example, shows a module including insights, e.g., of websites (external and internal) that may provide some contextually relevant data for the workspace 465. The illustrated workspace module 470, for example, shows a module including a bar graph, e.g., of travel spending by entity (here a third party). The illustrated workspace module 475, for example, shows a module including a table, e.g., of entries for vendor contact information.

FIG. 5 is a flow chart illustrating an example method 500 for dynamically annotating virtual workplaces. The illustrated methods are described with respect to the system 100 of FIG. 1, but these methods could be used by any other system. Moreover, the system 100 may use any other techniques for performing these tasks. Thus, many of the steps in these flowcharts may take place simultaneously and/or in different order than as shown. The system 100 may also use methods with additional steps, fewer steps, and/or different steps, so long as the methods remain appropriate.

Method 500 includes two high processes: (1) assigning an annotation to aggregated data from steps 502 to 512; and (2) presenting the annotation to a different user aggregating associated data. At step 502, a first virtual workplace is generated. At step 504, a selection for a measure, dimension or filter is received. For example, the user may select a measure and filter or a dimension and filter to apply to data. Next, at step 506, the first data is aggregated based on the selection of the measure, dimension and/or filter. The first aggregated is presented through the first virtual workplace at step 508. In connection with the presented data, a request to annotate the first aggregated data is received at step 510. At step 512, the annotation is assigned to the first aggregated data.

As for presenting the annotation, at step 514, a second virtual workplace is generated. At step 516, a selection of at least one of a measure, dimension, or filter is received. Next, at step 518, second data is aggregated in accordance with the measure, dimension, and/or filter. The second aggregated data is presented in the second virtual workplace at step 520. If the second aggregated data is semantically proximate the first aggregated data, then, at step 524, the annotation is presented in the second virtual workplace. If the data is not semantically proximate, execution ends.

A number of embodiments of the invention have been described. Nevertheless, it will be understood that various modifications may be made without departing from the spirit and scope of the invention. Accordingly, other embodiments are within the scope of the following claims.

What is claimed is:

1. A method performed with a computing system for providing user-based context to a virtual workspace, the method comprising:
   generating a first virtual workspace viewable by a user on a graphical user interface, the virtual workspace enabling the user to access a plurality of separate workspace applications in a business enterprise using a computing system remote from the business enterprise;
   receiving, by a workspace application from the plurality of workspace applications, a request to present first data aggregated from multiple data objects based on a measure and at least one of a filter or a dimension, the workspace application selects the data from the multiple data objects using the measure and calculates the first aggregated data based on data from the multiple data objects and the at least one of the filter or the dimension;
   determining the first aggregated data overlaps aggregated data in a second virtual workspace based on comparing the measure and the at least one of the filter or the dimension used to generate the first aggregated data to a measure and at least one of a filter or a dimension used to generate the aggregated data in the second virtual workspace;
   determining an amount of annotated data and an amount of non-annotated data in the first aggregated data;
   determining a ratio of the amount of annotated data and the amount of non-annotated exceed a threshold;
   in response to exceeding the threshold, identifying user annotations assigned to the overlapping aggregated data generated in the second virtual workspace; and
   presenting the user annotations in the first virtual workspace viewable by the user.

2. The method of claim 1, wherein the user comprising a first user, the second virtual workspace is viewable by the second user, and the user annotations are generated by the second user.

3. The method of claim 1, wherein determining the aggregated data overlaps aggregated data in the second virtual workspace comprises:
   identifying a first filter used to generate the first aggregated data;
   identifying a second filter used to generate the overlapping aggregated data; and
   determine the first filter defines a first range within a second range defined by the second filter.

4. The method of claim 1, wherein the annotation comprises at least one of a text note, a document, a picture, or a voice note.

5. An apparatus comprising instructions embodied on a tangible, non-transitory computer-readable media, the instructions operable when executed to cause a computing system to perform operations comprising:
   generating a first virtual workspace viewable by a user on a graphical user interface, the virtual workspace enabling the user to access a plurality of separate workspace applications in a business enterprise using a computing system remote from the business enterprise;
   receiving, by a workspace application from the plurality of workspace applications, a request to present first data aggregated from multiple data objects based on a measure and at least one of a filter or a dimension, the workspace application selects the data from the multiple data objects using the measure and calculates the first aggregated data based on data from the multiple data objects and the at least one of the filter or the dimension;
   determining the first aggregated data overlaps aggregated data in a second virtual workspace based on comparing the measure and the at least one of the filter or the dimension used to generate the first aggregated data to a measure and at least one of a filter or a dimension used to generate the aggregated data in the second virtual workspace;
   determining an amount of annotated data and an amount of non-annotated data in the first aggregated data;
   determining a ratio of the amount of annotated data and the amount of non-annotated exceed a threshold;
   in response to exceeding the threshold, identifying user annotations assigned to the overlapping aggregated data generated in the second virtual workspace; and
   presenting the user annotations in the first virtual workspace viewable by the user.

6. The apparatus of claim 5, wherein the user comprising a first user, the second virtual workspace is viewable by the second user, and the user annotations are generated by the second user.

7. The apparatus of claim 5, wherein the operations comprising determining the aggregated data overlaps aggregated data in the second virtual workspace comprises the operations comprising:
   identifying a first filter used to generate the first aggregated data;
   identifying a second filter used to generate the overlapping aggregated data; and
   determine the first filter defines a first range within a second range defined by the second filter.

8. The apparatus of claim 5, wherein the annotation comprises at least one of a text note, a document, a picture, or a voice note.

9. A computing system, comprising
   one or more memory modules;
   one or more processors;
   a graphical user interface; and
   a contextual services module stored on one or more of the memory modules, the contextual services module operable when executed with the one or more processors to perform operations comprising:
     generating a first virtual workspace viewable by a user on a graphical user interface, the virtual workspace enabling the user to access a plurality of separate workspace applications in a business enterprise using a computing system remote from the business enterprise;
     receiving, by a workspace application from the plurality of workspace applications, a request to present first data aggregated from multiple data objects based on a measure and at least one of a filter or a dimension, the workspace application selects the data from the multiple data objects using the measure and calculates the first aggregated data based on data from the multiple data objects and the at least one of the filter or the dimension;
     determining the first aggregated data overlaps aggregated data in a second virtual workspace based on comparing the measure and the at least one of the filter or the dimension used to generate the first aggregated data to a measure and at least one of a filter or a dimension used to generate the aggregated data in the second virtual workspace;
     determining an amount of annotated data and an amount of non-annotated data in the first aggregated data;

determining a ratio of the amount of annotated data and the amount of non-annotated exceed a threshold;

in response to exceeding the threshold, identifying user annotations assigned to the overlapping aggregated data generated in the second virtual workspace; and presenting the user annotations in the first virtual workspace viewable by the user.

10. The computing system of claim 9, wherein the user comprising a first user, the second virtual workspace is viewable by the second user, and the user annotations are generated by the second user.

11. The computing system of claim 9, wherein the operations comprising determining the aggregated data overlaps aggregated data in the second virtual workspace comprises the operations comprising:

identifying a first filter used to generate the first aggregated data;

identifying a second filter used to generate the overlapping aggregated data; and determine the first filter defines a first range within a second range defined by the second filter.

12. The computing system of claim 9, wherein the annotation comprises at least one of a text note, a document, a picture, or a voice note.

* * * * *